UNITED STATES PATENT OFFICE.

WILLIAM N. BLAKEMAN, JR., OF NEW YORK, N. Y.

IMPROVEMENT IN COMPOSITIONS FOR BED-STUFFINGS.

Specification forming part of Letters Patent No. 219,141, dated September 2, 1879; application filed March 12, 1879.

*To all whom it may concern:*

Be it known that I, WILLIAM N. BLAKEMAN, Jr., of the city of New York, in the county and State of New York, have invented a new and useful compound or composition of matter for a cover and filler for bed, cushion, and like stuffings, which compound is fully described in the following specification.

This invention relates to a compound to be used as a cover and filler for saturating such materials as may form the stuffing for beds, cushions, seats, carpet-linings, and similar articles, thereby rendering such material much more elastic and durable in character.

In order to prepare this compound, take such material as commercial glue and digest the same in cold water, afterward reducing the mass to a magma in a water-bath, heating the magma for some time in the water-bath, in order to expel all excess of water therefrom. Then take glycerine and some astringent, styptic, or oxidizing agent or agents, such as are hereinafter mentioned, or their equivalents, and mix and heat the same in the water-bath, thereby forming a hot solution. This solution and the magma are then to be incorporated while still exposed to the water-bath, and kept in a state of agitation until the union is complete.

Into the above-mentioned liquid or pasty mass, while hot, may then be immersed sponge, hair, shred wood or excelsior, shavings, asbestus, sea-weed, corn-husks, felt, wool, or any material of a fibrous or cellular structure suitable for stuffing a bed, cushion, or seat, or for forming a carpet-lining, all of which materials, when thus treated and cooled or partially dried, will be rendered much more elastic and more permanently elastic than when used in their natural state.

Gelatine, chondrine, or other gelatinous material, and even starch or albumen, may be substituted for the glue, though the latter is considered preferable. Molasses or treacle may likewise be substituted for the glycerine, though glycerine is considered preferable.

In most cases I prefer to mix the glycerine with some astringent, styptic, or oxidizing agent, as above described; but such mixtures need not always be made. The glue and glycerine alone will form a very good compound for treating sponge and some other materials; but in general the addition of one or more astringent, styptic, or oxidizing agents is advantageous. The glycerine, however, being chiefly used as a softening agent, may in some cases be omitted. The quantity and the entire absence of the glycerine will depend somewhat upon the character of the stuffing material treated. While, in general, therefore, the glue, the glycerine, and the oxidizer, or equivalent agent or agents, are all preferably used, the glue or gelatinous material may be treated in some cases with an oxidizer or other mentioned equivalent agents and the glycerine, either or both, depending upon the character of the stuffing material used and the hardness desired to be given to the cover and filler composition.

The astringent, styptic, and oxidizing agents which may be used are quite numerous, among which may be enumerated, as those in general use, tannic acid, chloride of sodium, chloride of aluminum, alum, the persalts or persulphate of iron, chromic acid, bichromate of potash, the permanganates of potash, metallic oxides, and equivalent agents.

While the above-described method of mixing and incorporating the ingredients with the stuffing material is the simplest process, and would answer in general, I do not confine myself to it closely, as it may be found advisable, in treating some materials, to first steep such material in a combination of gelatine and glycerine, and afterward attack it with a solution of glycerine and an astringent or oxidizing agent; or in case one or more agents are used as astringents or oxidizers, one of which acts more violently than the other, it would be desirable to mix one with the glue and the other with the glycerine, and afterward incorporate the mixtures. The glycerine preserves the gelatine from excessive hardening, and the astringent or oxidizer makes the glue tougher, more cohesive, and semi or entirely insoluble, according to quantity and character of the agent used.

While in the combined and melted state the composition may also, if desired, be drawn into threads and cooled, or a blast of air may be introduced, and thus fill it with air-cells.

I do not, therefore, limit myself to any exact proportions of the ingredients constituting this invention, and may vary the said ingredients in number and quantity as practice shall determine to be best for the different materials with which they will be combined for imparting elasticity thereto.

When bichromate of potash and glycerine are combined in the water-bath, and afterward mixed with melted glue or gelatine, some characteristics are exhibited which I am not aware have been previously noticed or known. The mass becomes exceedingly cohesive, and on cooling presents some of the traits of caoutchouc or india-rubber, and can be used in some cases as a substitute therefor—as, for instance, for boxed springs and for printers' rollers; but for all such purposes I reserve the composition as the subject for other Letters Patent. The explanation of this reaction seems to be that the bichromate of potash parts with its oxygen to the glycerine, rendering it a dark green, and the glycerine, by heat and agitation, in turn transfers the oxygen to the gelatine.

Having thus fully described this composition, its method of manufacture and application as of my invention I claim—

1. As a cover and filler for bed, cushion, and like stuffings, a new compound or compotion consisting of glue and glycerine applied to said stuffings and rendered either insoluble or soluble, substantially as and for the purpose set forth.

2. As a cover and filler for bed, cushion, and like stuffings, a new compound or composition consisting of commercial glue treated with an astringent, styptic, or oxidizing agent or agents, and glycerine, one or both, as described, substantially as and for the purpose set forth.

WM. N. BLAKEMAN, Jr.

Witnesses:
   P. R. VOORHEES,
   EDWIN F. COREY.